US011846436B2

(12) United States Patent
Nakano et al.

(10) Patent No.: US 11,846,436 B2
(45) Date of Patent: Dec. 19, 2023

(54) FLOOR-STANDING AIR CONDITIONER (71) Applicant: DAIKIN INDUSTRIES, LTD., Osaka (JP)

(72) Inventors: Akihiro Nakano, Osaka (JP); Fumika Masuda, Osaka (JP); Seiji Oka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/124,213

(22) Filed: Mar. 21, 2023

(65) Prior Publication Data
US 2023/0221010 A1 Jul. 13, 2023

Related U.S. Application Data (63) Continuation of application No. PCT/JP2021/019590, filed on May 24, 2021.

(30) Foreign Application Priority Data

Sep. 24, 2020 (JP) ................................. 2020-160048

(51) Int. Cl.
*F24F 1/005* (2019.01)
*F24F 11/72* (2018.01)
*F24F 1/0014* (2019.01)

(52) U.S. Cl.
CPC ............ *F24F 1/005* (2019.02); *F24F 1/0014* (2013.01); *F24F 11/72* (2018.01)

(58) Field of Classification Search
CPC .................. F24F 11/755; F24F 1/0014; F24F 11/72–11/79; F24F 13/24; F24F 2013/247; F24F 13/10–2013/1493
See application file for complete search history.

(56) References Cited

U.S. PATENT DOCUMENTS

2006/0037355 A1 2/2006 Hwang et al.
2017/0350614 A1 12/2017 Nagaoka et al.

FOREIGN PATENT DOCUMENTS

CN 104613545 * 5/2015 ............. F24F 13/14
EP 2 098 795 A1 9/2009
(Continued)

OTHER PUBLICATIONS

Machine English Language translation of CN104613545. Translated Jun. 2023 (Year: 2015).*

(Continued)

*Primary Examiner* — Cassey D Bauer
(74) *Attorney, Agent, or Firm* — Birch, Stewart, Kolasch & Birch, LLP (57) ABSTRACT

A floor-standing air conditioner includes a first member that opens or closes a first flow path, a second member that opens or closes a second flow path, and a control unit that controls a fan, the first member, and the second member. The control unit is configured to perform a first blowing process of blowing out air from the first blow-out port with the first flow path opened by the first member and the second flow path closed by the second member, a second blowing process of blowing out air from the second blow-out port with the first flow path closed by the first member and the second flow path opened by the second member, and a blow-out port switching process of blowing out air from both the first blow-out port and the second blow-out port during switching between the first blowing process and the second blowing process.

7 Claims, 10 Drawing Sheets

(56) References Cited

FOREIGN PATENT DOCUMENTS

| | | |
|---|---|---|
| JP | 60-41730 U | 3/1985 |
| JP | 60-135528 U | 9/1985 |
| JP | 2-3102 B2 | 1/1990 |
| JP | 2-71027 A | 3/1990 |
| JP | 2002-257403 A | 9/2002 |
| JP | 2008-116082 A | 5/2008 |
| JP | 2016-109356 A | 6/2016 |

OTHER PUBLICATIONS

International Preliminary Report on Patentability and Written Opinion of the International Searching Authority for International Application No. PCT/JP2021/019590, dated Apr. 6, 2023.

\* cited by examiner

FLOOR-STANDING AIR CONDITIONER

CROSS REFERENCE TO RELATED APPLICATIONS

This application is a Continuation of PCT International Application No. PCT/JP2021/019590, filed on May 24, 2021, which claims priority under 35 U.S.C. § 119(a) to Patent Application No. 2020-160048, filed in Japan on Sep. 24, 2020, all of which are hereby expressly incorporated by reference into the present application.

TECHNICAL FIELD

The present disclosure relates to a floor-standing air conditioner.

BACKGROUND ART

A floor-standing air conditioner provided with blow-out ports in upper end portion and a lower end portion of a housing is known (see, for example, JP S60-41730 Y). Such a floor-standing air conditioner includes an upper fan that sends air to the blow-out port located at the upper end portion of the housing and a lower fan that sends air to the blow-out port located at the lower end portion of the housing. An upper damper can open or close an air flow path between the blow-out port at the upper end portion of the housing and the upper fan. On the other hand, a lower damper can open or close an air flow path between the blow-out port located at the lower end of the housing and the lower fan.

In the floor-standing air conditioner having the above-described configuration, when air is blown toward an upper side of a room, the upper fan is driven with the upper damper open and the lower damper closed. On the other hand, when air is blown toward a lower side of the room, the lower fan is driven with the upper damper closed and the lower damper open.

SUMMARY

The present disclosure provides, as a solution to the above-described problems, a floor-standing air conditioner including a casing including a first flow path connected to a first blow-out port positioned at an upper portion and a second flow path connected to a second blow-out port positioned at a lower portion, a fan that blows out air from at least one of the first blow-out port and/or the second blow-out port, a first member that opens or closes the first flow path, a second member that opens or closes the second flow path, and a control unit that controls the fan, the first member, and the second member, in which the control unit is configured to perform a first blowing process of blowing out air from the first blow-out port with the first flow path opened by the first member and the second flow path closed by the second member, and a second blowing process of blowing out air from the second blow-out port with the first flow path closed by the first member and the second flow path opened by the second member, and perform a blow-out port switching process of blowing out air from both the first blow-out port and the second blow-out port during switching between the first blowing process and the second blowing process.

DESCRIPTION OF EMBODIMENTS

Embodiments of the present disclosure will be described below with reference to the accompanying drawings. Note that the following description is merely illustrative in nature and is not intended to limit the present disclosure, applications of the present disclosure, or uses of the present disclosure. In addition, all the drawings give schematic illustrations in which dimensional ratios and the like are different from actual ratios.

Figure 1:
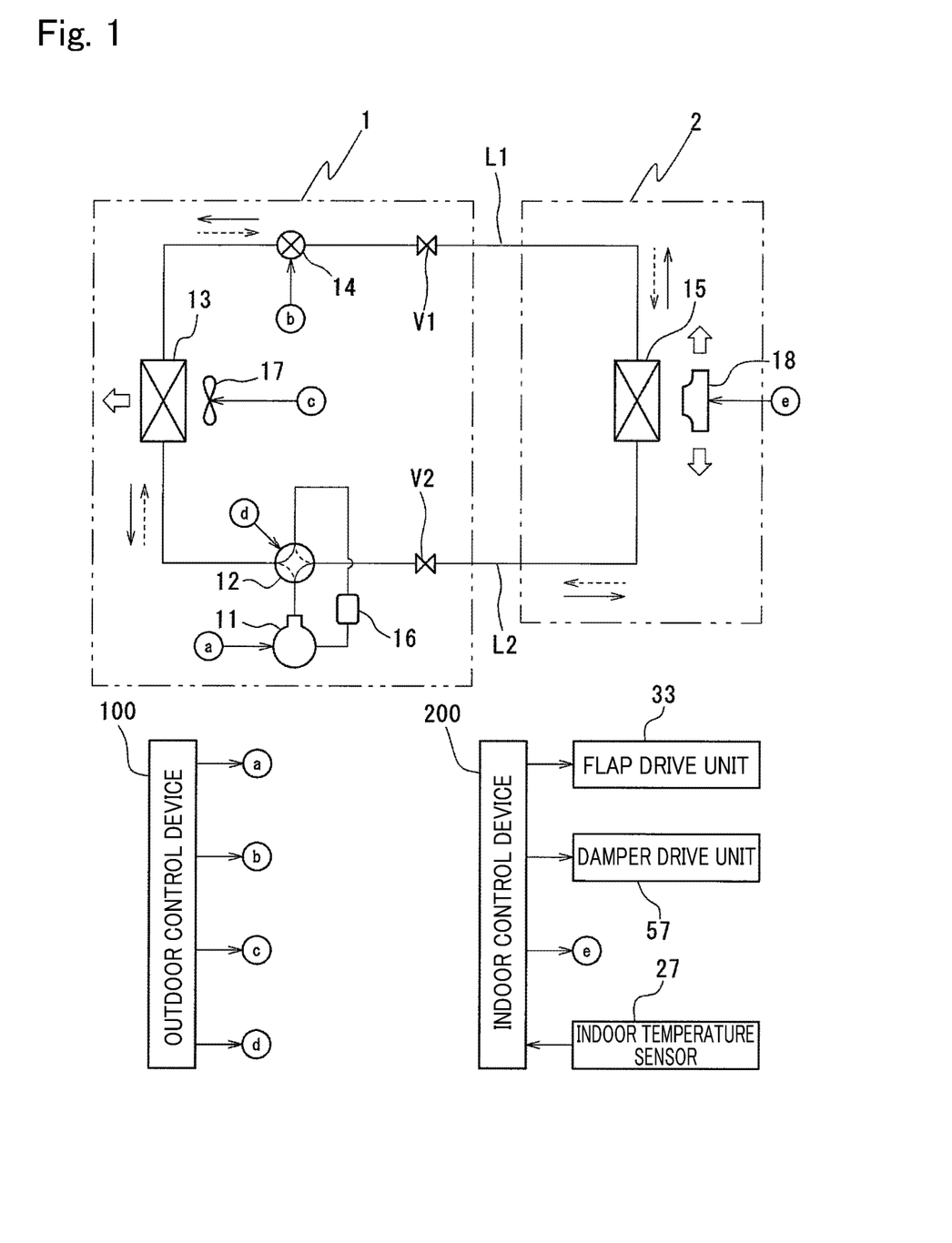
FIG. 1 is a circuit diagram illustrating a refrigerant circuit of an air conditioner according to the present embodiment.

FIG. 1 is a diagram illustrating a refrigerant circuit RC provided in an air conditioner of an embodiment of the present disclosure. This air conditioner is of a type in which an outdoor unit 1 is paired one-to-one with an indoor unit 2. Note that the air conditioner of the present embodiment is an example of a floor-standing air conditioner.

The air conditioner includes: a compressor 11; a four-way switching valve 12 having one end connected to a discharge side of the compressor 11; an outdoor heat exchanger 13 having one end connected to the other end of the four-way switching valve 12; an electric expansion valve 14 having one end connected to the other end of the outdoor heat exchanger 13; an indoor heat exchanger 15 having one end connected to the other end of the electric expansion valve 14 via a shutoff valve V1 and a connection pipe L1; and an accumulator 16 having one end connected to the other end of the indoor heat exchanger 15 via a connection pipe L2, a shutoff valve V2, and the four-way switching valve 12, and the other end connected to an intake side of the compressor 11.

The compressor 11, the four-way switching valve 12, the outdoor heat exchanger 13, the electric expansion valve 14, the indoor heat exchanger 15, and the accumulator 16 each constitute a part of the refrigerant circuit RC of the air conditioner. This refrigerant circuit RC is filled with an R32 refrigerant.

The compressor 11, the four-way switching valve 12, the outdoor heat exchanger 13, the electric expansion valve 14, the accumulator 16, and an outdoor fan 17 are mounted on the outdoor unit 1. The outdoor unit 1 includes an outdoor control device 100 that controls the compressor 11, the electric expansion valve 14, the outdoor fan 17, and the like.

On the other hand, the indoor heat exchanger 15 and a turbo fan 18 are mounted on the indoor unit 2. The indoor unit 2 includes an indoor control device 200 that controls the turbo fan 18 and the like on the basis of a signal from a remote controller (not illustrated) or an indoor temperature sensor 27. Note that the indoor control device 200 is an example of a control unit, and the turbo fan 18 is an example of a fan.

The air conditioner switches the four-way switching valve 12 to a switching position indicated by a solid line and activates the compressor 11 for the heating operation, and switches the four-way switching valve 12 to a switching position indicated by a dotted line and activates the compressor 11 for the cooling operation and dehumidifying operation. Note that a direction of the solid arrow indicates a direction in which the R32 refrigerant flows during the heating operation. A direction of the dotted arrow indicates a direction in which the R32 refrigerant flows during the cooling operation and dehumidifying operation.

Figure 2:
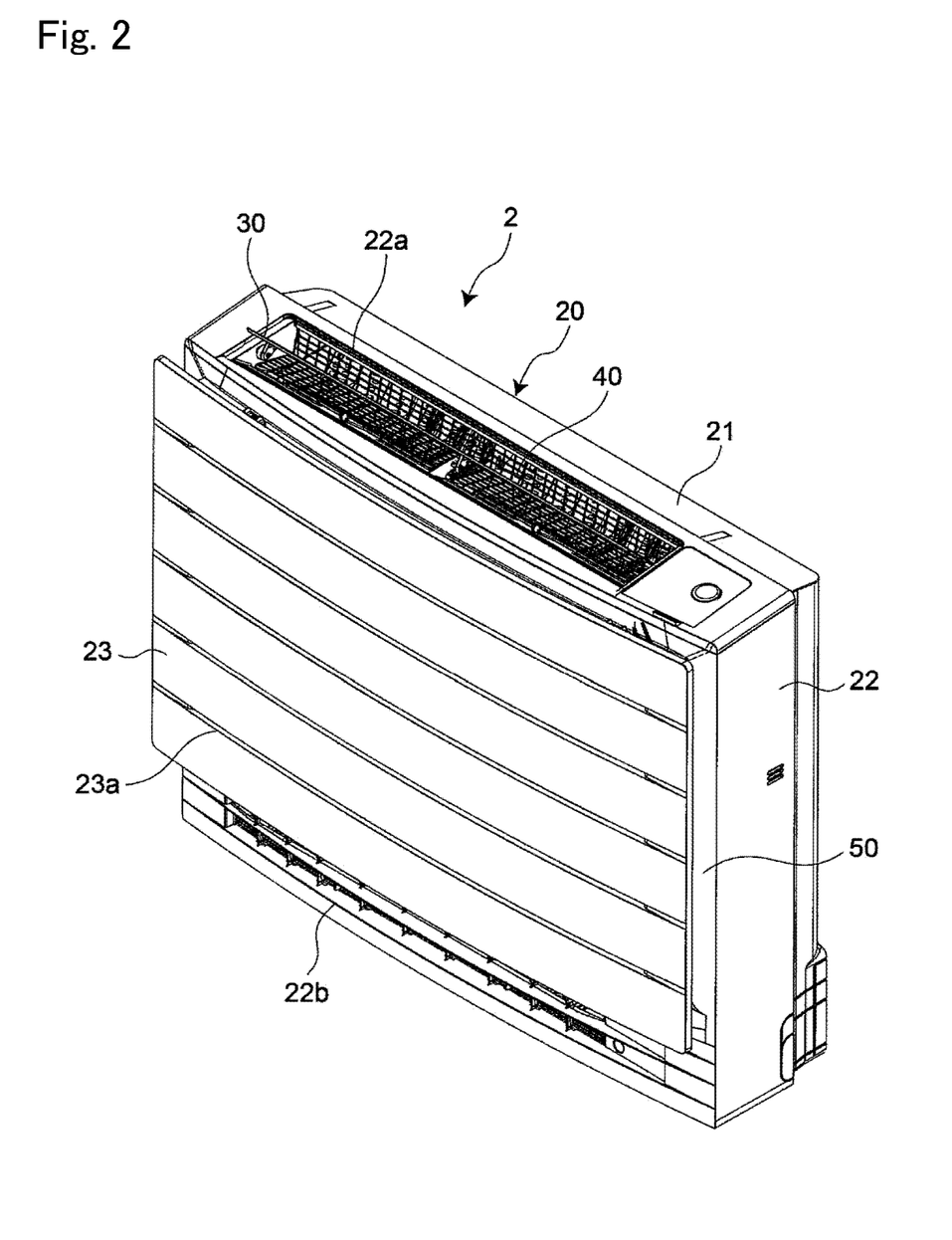
FIG. 2 is a perspective view of an indoor unit of the air conditioner according to the present embodiment.
Figure 3:
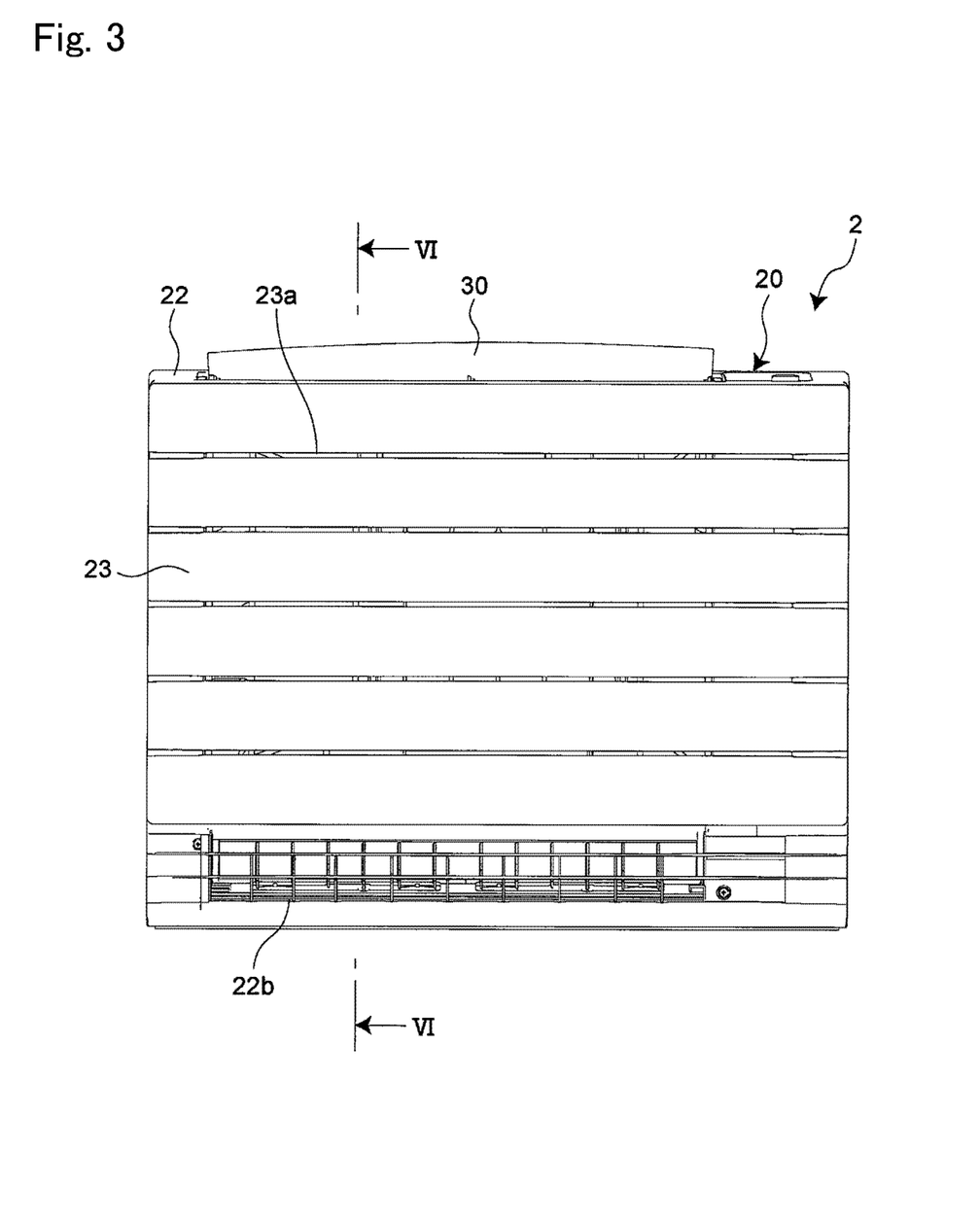
FIG. 3 is a front view of the indoor unit illustrated in FIG. 2.

FIG. 2 is a perspective view of the indoor unit 2 of the floor-standing air conditioner. A horizontal flap 30 that is an example of a first member has rotated to an open position. FIG. 3 is a front view of the indoor unit 2 of FIG. 2.

As illustrated in FIGS. 2 and 3, the indoor unit 2 includes a casing 20 that accommodates the turbo fan 18 (illustrated in FIG. 1) and the like. The casing 20 includes a bottom frame 21, a front frame 22, and an intake panel 23.

The front frame 22 is attached to the bottom frame 21 and is located on a front side of the bottom frame 21. The front frame 22 includes an approximately rectangular opening (not illustrated) on its front surface. On a top surface of the front frame 22, an upper blow-out port 22a through which conditioned air blows toward a ceiling of a room is provided. The horizontal flap 30 is rotatably attached to an upper portion of the front frame 22. The horizontal flap 30 controls a vertical airflow direction of conditioned air blown out from the upper blow-out port 22a. More specifically, the horizontal flap 30 is rotated to adjust an angle between a blow-out direction of the conditioned air at the upper blow-out port 22a and a horizontal plane. A fan guard 40 is provided below the horizontal flap 30. Note that the upper blow-out port 22a is an example of a blow-out port. The horizontal flap 30 is an example of a horizontal blade.

On a front surface of a lower portion of the front frame 22, a lower blow-out port 22b is provided. Conditioned air blown out from the lower blow-out port 22b flows along a floor surface of the room. Note that a vertical airflow direction of the conditioned air at the lower blow-out port 22b is not adjustable.

The intake panel 23 is attached to the front frame 22 so as to cover the opening of the front frame 22 and so as not to cover the lower blow-out port 22b of the front frame 22. The intake panel 23 includes a plurality of front intake ports 23a provided at predetermined intervals in the vertical direction. A space between each side of the intake panel 23 and the front frame 22 serves as a side intake port 50 (only one side intake port 50 between a right side of the intake panel 23 and the front frame 22 is illustrated in FIG. 2). When the turbo fan 18 is driven, indoor air is taken in the casing 20 through the front intake ports 23a and the side intake ports 50.

Figure 4:
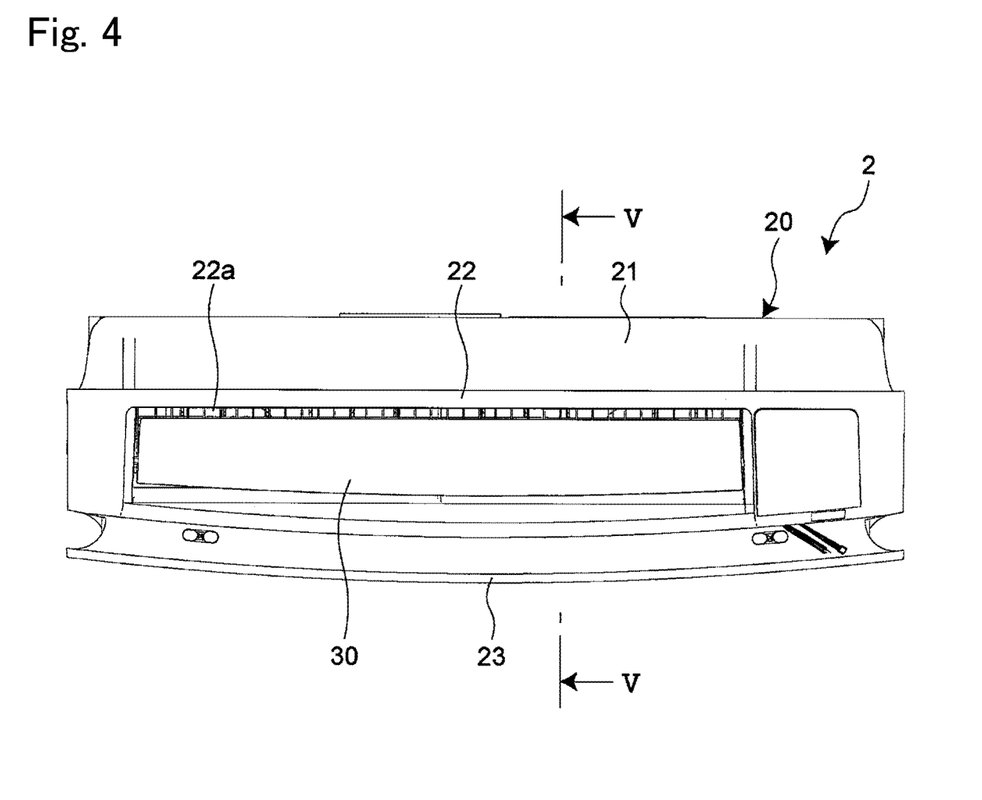
FIG. 4 is a plan view of the indoor unit illustrated in FIG. 2.

FIG. 4 is a top view of the indoor unit 2 with the horizontal flap 30 in a closed state.

When the horizontal flap 30 is in the closed state, the upper blow-out port 22a is smaller in opening area than when the horizontal flap 30 is in an open state. The horizontal flap 30 in the closed state has a gap from a peripheral edge of the upper blow-out port 22a.

Figure 5:
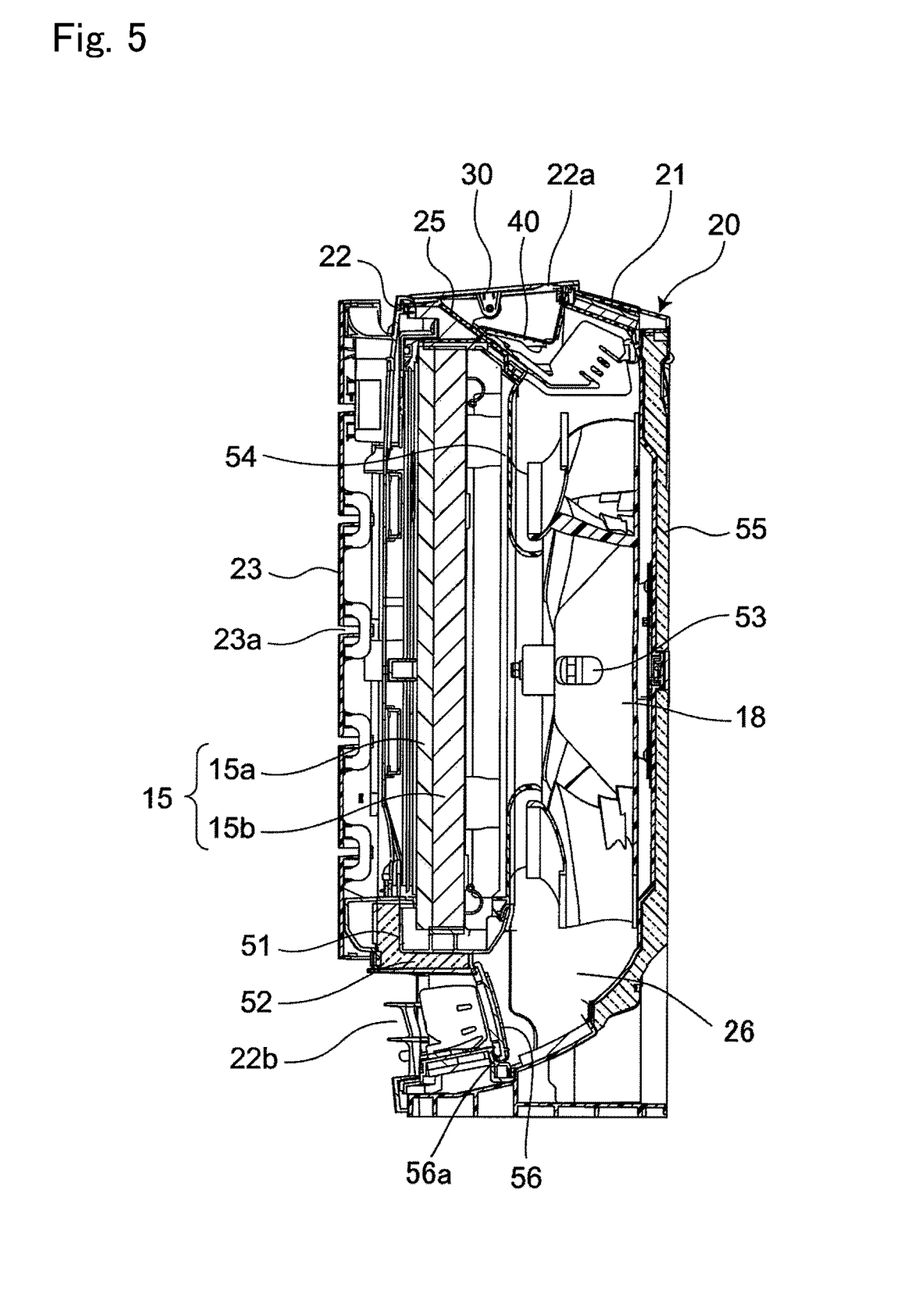
FIG. 5 is a cross-sectional view of FIG. 4 taken along a line V-V.

FIG. 5 is a cross-sectional view of FIG. 4 taken along a line V-V.

The indoor heat exchanger 15 and the turbo fan 18 are disposed in the casing 20.

The indoor heat exchanger 15 is disposed above a drain pan 51, and includes first and second heat exchange units 15a, 15b. The indoor air from the front intake ports 23a and the side intake ports 50 passes through the first and second heat exchange units 15a, 15b, so as to be adjusted in temperature and the like to become conditioned air. On a front side and lower side of the drain pan 51, a first heat insulating material 52 is disposed.

The turbo fan 18 is driven by a motor 53 to rotate. At this time, the conditioned air from the indoor heat exchanger 15 is taken in the turbo fan 18 through the space in a bell mouth 54, and then blown out from the turbo fan 18 to the upper blow-out port 22a that is a first blow-out port and the lower blow-out port 22b that is a second blow-out port. In the present embodiment, the motor 53 can change, stepwise at a plurality of levels, an airflow volume of the conditioned air blown out from the inside of the casing 20 to the outside of the casing 20 by the rotation of the turbo fan 18.

The motor 53 is fixed to an approximately center of the bottom frame 21 so as to make a shaft of the motor 53 parallel to a front-rear direction. A second heat insulating material 55 is attached to a back surface of the bottom frame 21.

A damper 56 that is an example of a second member is disposed in a blow-out passage 26 that is a second flow path located in a lower portion of the casing 20. The damper 56 receives a driving force of a damper drive unit 57 including a motor and the like to rotate about a shaft 56a connected to a lower end of the damper 56. The shaft 56a is located near a lower member that constitutes a part of the blow-out port. When an upper end of the damper 56 comes into contact with an upper member (here, resin with which the first heat insulating material 52 is coated) constituting a part of the blow-out port, the blow-out passage 26 is closed, and the lower blow-out port 22b does not blow out the conditioned air. At this time, when the damper 56 is rotated so as to separate the upper end of the damper 56 from the first heat insulating material 52, the blow-out passage 26 is opened to allow the lower blow-out port 22b to blow out the conditioned air. Note that the damper drive unit 57 is controlled by the indoor control device 200.

The indoor control device 200 selects any one of upward-downward blowing control, upward blowing control, or downward blowing control during the air conditioning operation. Under the upward-downward blowing control, the upper blow-out port 22a and the lower blow-out port 22b both blow out the conditioned air. Under the upward blowing control, only the upper blow-out port 22a blows out the conditioned air. Under the downward blowing control, only the lower blow-out port 22b blows out the conditioned air. In particular, during the foot heating operation to be described later, the indoor control device 200 performs a first blowing process of blowing air from the upper blow-out port 22a, a second blowing process of blowing air from the lower blow-out port 22b, and a blow-out port switching process of blowing air from both the blow-out ports when switching from the upper blow-out port 22a to the lower blow-out port 22b is made.

Figure 6:
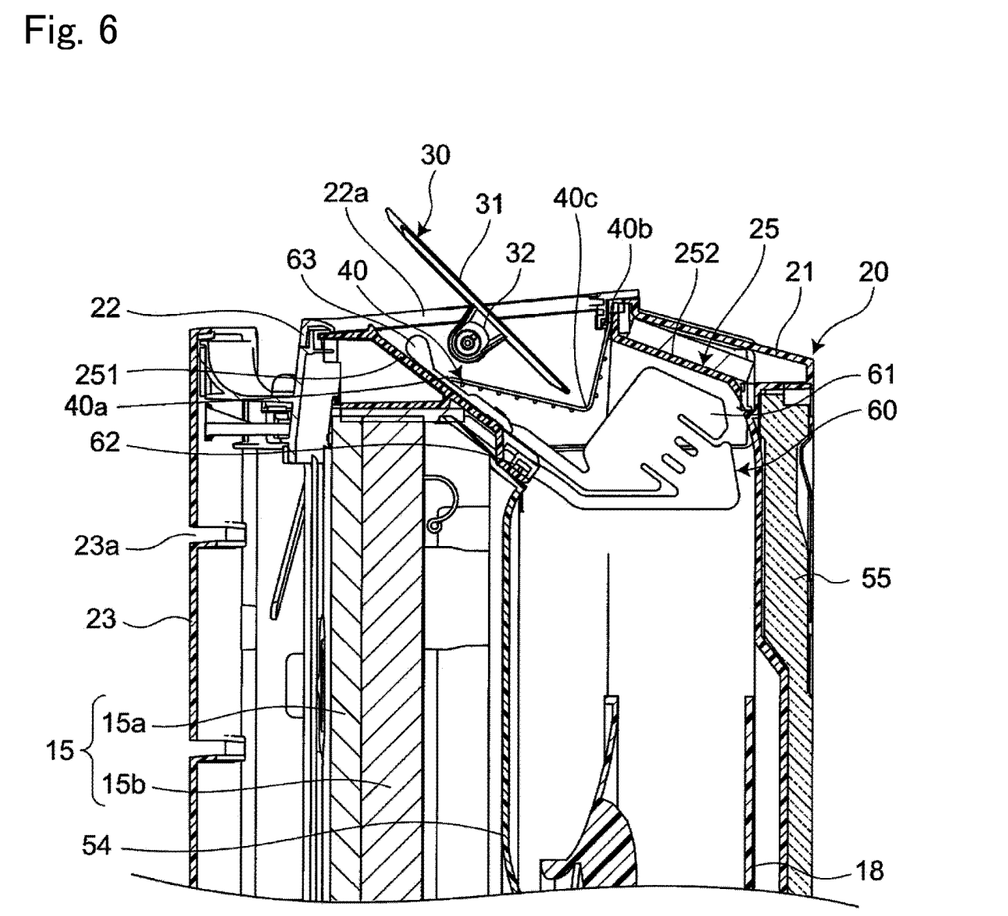
FIG. 6 is a cross-sectional view of FIG. 3 taken along a line VI-VI.

FIG. 6 is an enlarged cross-sectional view of an upper portion of FIG. 3 taken along a line VI-VI.

The horizontal flap 30 includes a flap main body 31 and support portions 32 (only a left support portion 32 is illustrated in FIG. 6) provided on both sides of the flap main body 31. Each support portion 32 is provided with a shaft (not illustrated) protruding laterally, and the shaft is rotatably attached to the upper portion of the front frame 22. The horizontal flap 30 receives a driving force of a flap drive unit 33 including a motor and the like to rotate about the shaft between the open position where the upper blow-out port 22a is fully open and a closed position where the upper blow-out port 22a is fully closed (for example, a rotation position of the horizontal flap 30 may be determined stepwise at a plurality of positions between the open position and the closed position). Note that the flap drive unit is controlled by the indoor control device 200.

A duct 25 that is a first flow path provided in an upper portion of the casing 20 guides the conditioned air, which the turbo fan 18 blew out, to the upper blow-out port 22a. The duct 25 includes a front wall 251 extending from a front edge of the upper blow-out port 22a into the casing 20, and a rear wall 252 extending from a rear edge of the upper blow-out port 22a into the casing 20.

The fan guard 40 is elastically deformable and is disposed in the duct 25. The fan guard 40 includes a front end 40a, a rear end 40b, and a bent portion 40c. The front end 40a and the rear end 40b are disposed so as to be closer to the upper blow-out port 22a than the bent portion 40c. The fan guard 40 is bent in an approximately V-shape as viewed from a side.

A plurality of perpendicular flaps 60 (only one is illustrated in FIG. 6) that control a horizontal airflow direction of the conditioned air are disposed upstream of the conditioned air relative to the fan guard 40. The plurality of perpendicular flaps 60 are arranged at predetermined intervals in the left-right direction in the upper portion of the casing 20. A plurality of perpendicular flaps 60 facing each other in a left half region of the upper blow-out port 22a are coupled to each other with a first coupling rod (not illustrated). On the other hand, a plurality of perpendicular flaps 60 facing each other in a right half region of the upper blow-out port 22a are coupled to each other with a second coupling rod (not illustrated). Note that each perpendicular flap 60 is an example of a perpendicular blade.

Each perpendicular flap 60 includes a flap main body 61 and an attachment portion 62 rotatably attached to a lower end of the front wall 251 of the duct 25. One of the plurality of perpendicular flaps 60 facing each other in the left half region of the upper blow-out port 22a includes an operation portion 63. One of the plurality of perpendicular flaps 60 facing each other in the right half region of the upper blow-out port 22a also includes an operation portion (not illustrated). Such operation portions 63 each extend from the front portion of the flap main body 61 along the front wall 251 of the duct 25 toward the upper blow-out port 22a.

In the air conditioner having the above-described configuration, when an operation button (not illustrated) (including a remote controller) is operated to select the heating operation, the compressor 11 is driven. Then, switching the four-way switching valve 12 as indicated by the solid line in FIG. 1 causes the R32 refrigerant discharged from the compressor 11 to circulate through the indoor heat exchanger 15, the electric expansion valve 14, and the outdoor heat exchanger 13 to return to the compressor 11.

The present embodiment is characterized by the air blowing control applied to a case where the foot heating operation (floor warming mode) is selected while air is blowing only from the upper blow-out port 22a after the start of the heating operation. Hereinafter, the air blowing control will be described with reference to the timing chart of FIG. 10 according to the flowcharts of FIGS. 7 to 9.

Figure 7:
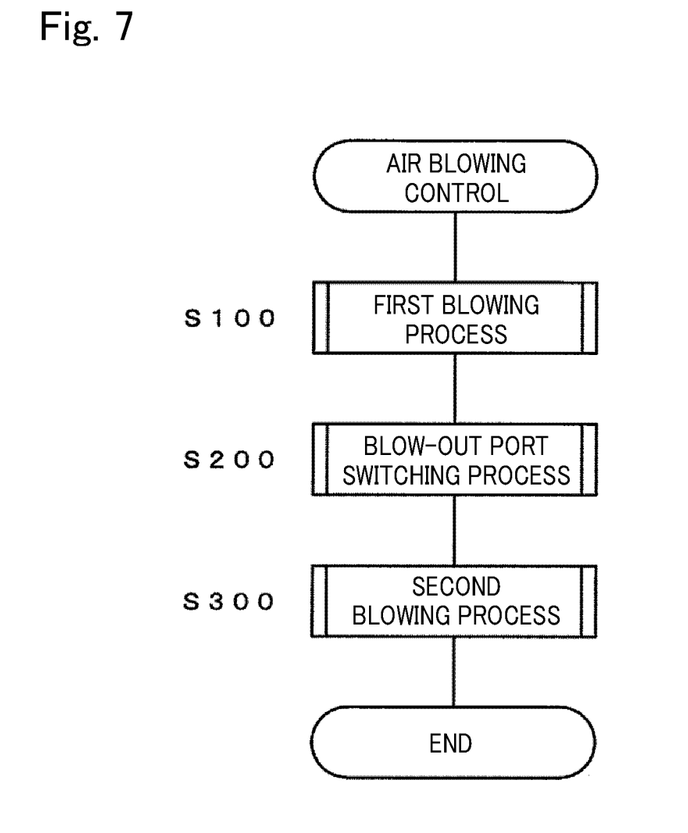
FIG. 7 is a flowchart of a blow-out port switching operation performed by the indoor unit of the air conditioner according to the present embodiment during a foot heating operation.

As illustrated in FIG. 7, under the air-conditioning control in a case where the foot heating operation is selected during the first blowing process of blowing air only from the upper blow-out port 22a, the second blowing process (step S300) is performed after the first blowing process (step S100) and the blow-out port switching process (step S200).

(First Blowing Process)

Figure 8:
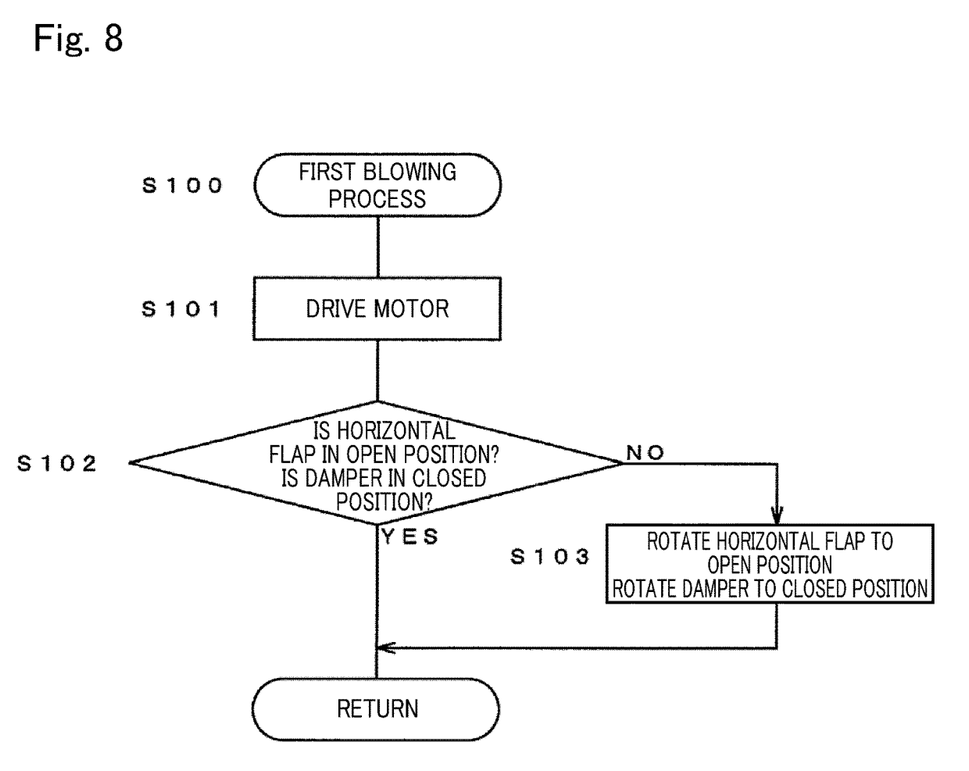
FIG. 8 is a flowchart of a first blowing process in FIG. 7.
Figure 10:
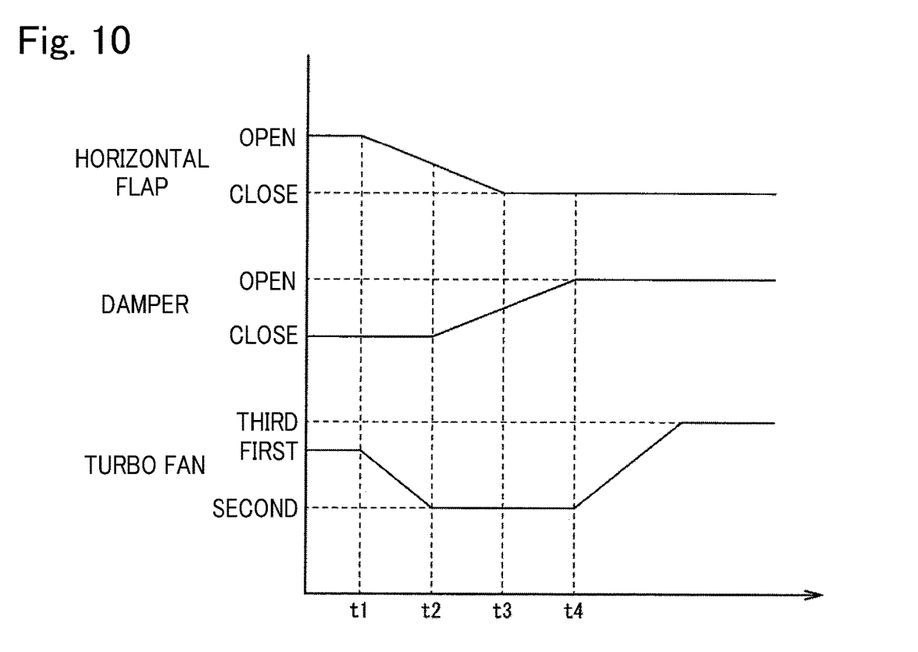
FIG. 10 is a timing chart of the blow-out port switching operation in FIG. 7.

As illustrated in FIG. 8, the motor 53 is driven to rotate the turbo fan 18 (step S101). As illustrated in FIG. 10, the number of rotations of the turbo fan 18 is a first number of rotations at which a set airflow volume is obtained. For example, the airflow volume may be selected with an operation button, or may be obtained by calculation based on a set temperature, an indoor temperature, or the like. A determination is made as to whether the horizontal flap 30 is in the open position and the damper 56 is in the closed position (step S102). If the horizontal flap 30 is not in the open position, the flap drive unit 33 is driven to rotate the horizontal flap 30 to the open position, and if the damper 56 is not in the closed position, the damper drive unit 57 is driven to rotate the damper 56 to the closed position (step S103). The horizontal flap 30 and the damper 56 are subjected to the opening or closing operation at the same time.

The rotation of the turbo fan 18 causes the indoor air to be taken in the casing 20 through the front intake ports 23a and the side intake ports 50. The indoor air taken in the casing 20 passes through the indoor heat exchanger 15 to be heated, so as to become the conditioned air. Since the damper 56 is in the closed position and the horizontal flap 30 is in the open position, the conditioned air is blown into the room only from the upper blow-out port 22a.

When a switch (not illustrated) or the like is operated to select the foot heating operation, the blow-out port switching process is performed.

(Blow-Out Port Switching Process)

Figure 9:
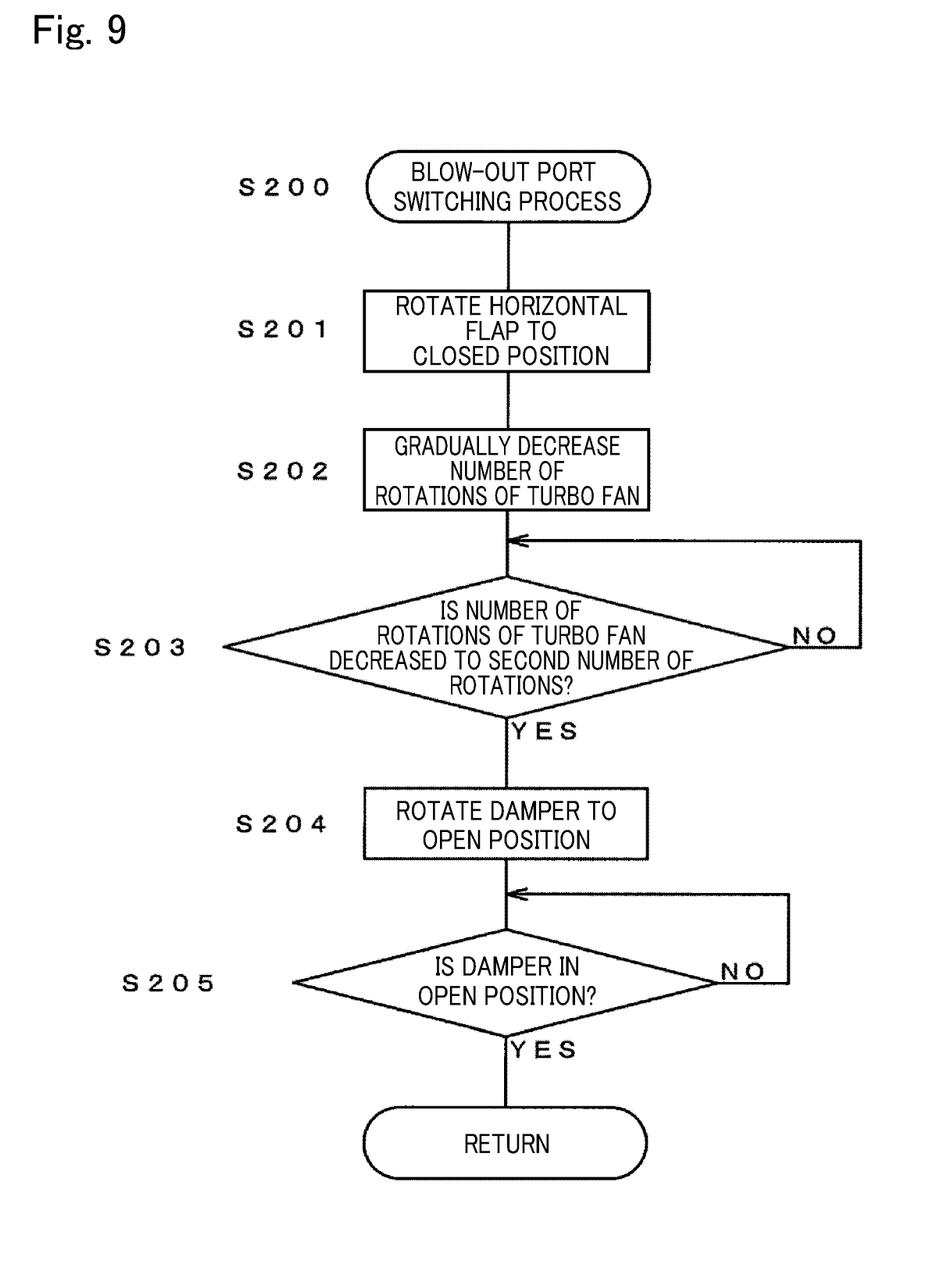
FIG. 9 is a flowchart of a blow-out port switching process in FIG. 7.

As illustrated in FIG. 9, the flap drive unit 33 is driven to rotate the horizontal flap 30 from the open position toward the closed position (indicated by a time t1 in FIG. 10) (step S201). Then, the number of rotations of the turbo fan 18 is gradually decreased from the initial first number of rotations (step S202).

A determination is made as to whether the number of rotations of the turbo fan 18 has decreased to a preset second number of rotations (step S203). For example, this determination may be made on the basis of an elapsed time from the start of the decrease in the number of rotations of the turbo fan 18. When the number of rotations of the turbo fan 18 decreases to the second number of rotations (indicated by a time t2 in FIG. 10), the damper drive unit 57 is driven to rotate the damper 56 from the closed position toward the open position (step S204). This causes the opening area of the blow-out passage 26 in the lower portion of the casing 20 to gradually increase. The damper 56 rotates clockwise about the shaft 56a against the flow of the conditioned air through the blow-out passage 26 in FIG. 5. This causes the conditioned air flowing through the blow-out passage 26 to generate airflow noise at the damper 56. It is difficult for the damper 56 to rotate due to air resistance. As described above, however, the number of rotations of the turbo fan 18 is decreased to the second number of rotations to reduce a flow velocity of the conditioned air flowing through the blow-out passage 26. This makes it possible to prevent the airflow noise from being generated and reduce resistance applied when the damper 56 rotates.

While the damper 56 is rotating, the horizontal flap 30 is also rotating toward the closed position, and the opening area at the upper blow-out port 22a gradually decreases. Then, the horizontal flap 30 moves to the closed position (indicated by a time t4 in FIG. 10), but the damper 56 continues to move to the open position even after the horizontal flap 30 moves to the closed position. Therefore, a determination is made as to whether the damper 56 has rotated to the open position (step S205). When the movement of the damper 56 to the open position is completed (indicated by the time t3 in FIG. 10), the switching from the upper blow-out port 22a to the lower blow-out port 22b is completed. While the damper 56 is rotating from the closed position toward the open position, the upper blow-out port 22a is open, so that air can be blown out from both the upper blow-out port 22a and the lower blow-out port 22b.

(Second Blowing Process)

After the movement of the damper 56 to the open position is completed, the number of rotations of the turbo fan 18 is increased from the second number of rotations to a third number of rotations greater than the first number of rotations. The damper 56 rotates, the damper 56 is disposed along the inner surface of the blow-out passage 26 and does not obstruct the flow of the conditioned air flowing through the blow-out passage 26 (of course, the rotation of the damper 56 is not obstructed). Therefore, even when the number of rotations of the turbo fan 18 is increased to make the airflow volume in the blow-out passage 26 larger, airflow noise is not generated by the damper 56. The second blowing process is made larger in maximum airflow volume than the first blowing process. This allows the conditioned air heated by the indoor heat exchanger 15 to sufficiently blow out into the room from the lower blow-out port 22b. As a result, the warm air supplied to the lower side of the room spreads upward while flowing far along the floor, and the room can be effectively heated.

As described above, according to the embodiment, the following effects can be produced.

(1) In order to switch the blow-out port of the conditioned air from the upper blow-out port 22a to the lower blow-out port 22b, the blow-out port switching process of blowing out the conditioned air from both the upper blow-out port 22a and the lower blow-out port 22b is performed. The switching from the upper blow-out port 22a to the lower blow-out port 22b is smoothly performed without stopping the turbo fan 18. That is, it does not take much time than a case where the upper blow-out port 22a is closed, the turbo fan 18 is stopped being driven, and then the lower blow-out port 22b is opened.

(2) The second blowing process is made larger in the airflow volume than the first blowing process. It is therefore possible to increase, after a heating state in the indoor heat exchanger 15 becomes stable, the volume of warm air blown out from the lower blow-out port 22b far along the floor, which makes the heating operation effective.

(3) The blow-out port switching process is made lower in the airflow volume than the first blowing process or the second blowing process. It is therefore possible to reduce, during the blow-out port switching, the volume of air blown out from each blow-out port to prevent the horizontal flap 30 and the damper 56 from generating airflow noise and prevent the rotation of the horizontal flap 30 and the damper 56 from being obstructed.

(4) The lower blow-out port 22b is opened or closed by the damper 56 provided in the blow-out passage 26 in the lower portion of the casing 20, so that the flow path can be securely blocked.

(5) When the damper 56 is rotated from the closed position to the open position, the number of rotations of the turbo fan 18 is reduced. It is therefore possible to reduce the resistance generated by airflow when the damper 56 rotates, allowing the damper 56 to easily rotate. It is possible to reduce airflow noise generated by the damper 56.

(6) The number of rotations of the turbo fan 18 is increased after the damper 56 moves to the open position. It is therefore possible to reduce the airflow resistance received by the damper 56 to prevent airflow noise from being generated and prevent the rotation of the damper 56 from being obstructed.

Note that the present invention is not limited to the configuration described in the above embodiment, and various modifications can be made.

In the above embodiment, the blow-out port switching is performed during the foot heating operation, but, for example, the blow-out port switching may be performed during a normal heating operation or a cooling operation, or a dehumidifying operation or a blowing operation as necessary. Switching from the upper blow-out port 22a to the lower blow-out port 22b and switching from the lower blow-out port 22b to the upper blow-out port 22a can be appropriately performed as necessary.

Figure 11:
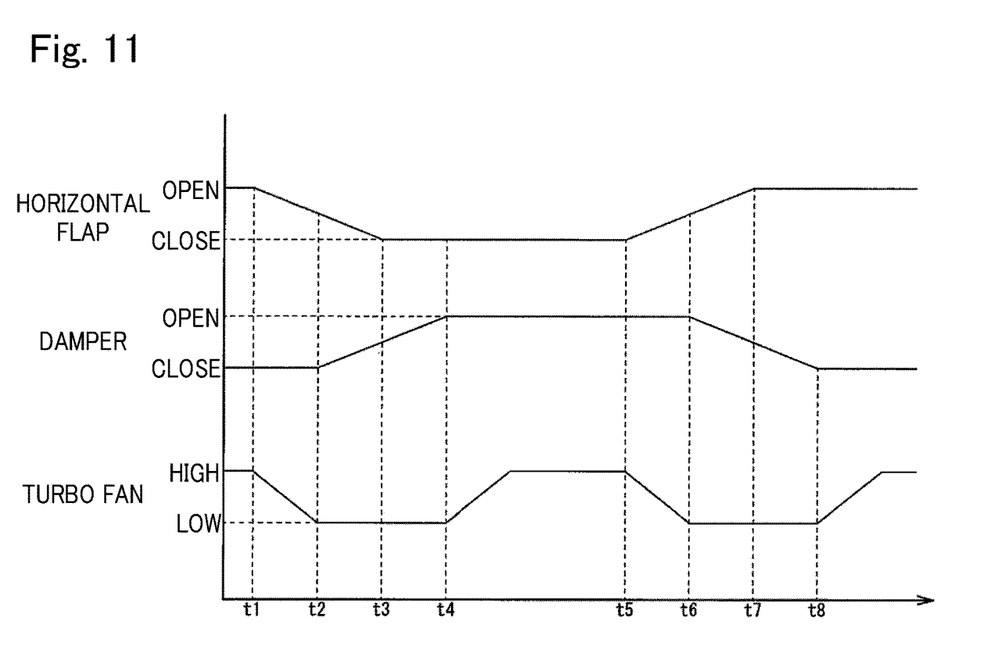
FIG. 11 is a timing chart of a blow-out port switching operation according to another embodiment.

The timing chart of FIG. 11 shows a case where the blow-out port switching is performed by manual operation made by the user, such as operation of an operation button provided on the remote controller (not illustrated) or the casing 20. The rotation operation of the horizontal flap 30 and the rotation operation of the damper 56 are controlled basically at the same timing as in the above embodiment, but the rotation of the turbo fan 18 is different in that the rotation is made with either high output or low output.

Specifically, when switching from the upper blow-out port 22a to the lower blow-out port 22b is performed (time t1), the turbo fan 18 is switched from the high output to the low output, and the damper 56 starts to rotate to the open position while the horizontal flap 30 is rotating to the closed position (time t2). The damper 56 continues to rotate even when the horizontal flap 30 has finished rotating to the closed position (time t3), and the turbo fan 18 is switched from the low output to the high output when the damper 56 has rotated to the open position (time t4). Specifically, when switching from the lower blow-out port 22b to the upper blow-out port 22a is performed (t5), the turbo fan 18 is switched from the high output to the low output, and the damper 56 starts to rotate to the closed position while the horizontal flap 30 is rotating to the open position (time t6). The damper 56 continues to rotate even when the horizontal flap 30 has finished rotating to the open position (time t7), and the turbo fan 18 is switched from the low output to the high output when the damper 56 has rotated to the closed position (time t8).

As described above, in either the switching from the upper blow-out port 22a to the lower blow-out port 22b or the switching from the lower blow-out port 22b to the upper blow-out port 22a, when the opening area of one blow-out port is decreased, the opening area of the other blow-out port is increased after the airflow volume is reduced. It is therefore possible to make the damper 56 less susceptible to airflow resistance during rotation to smoothly rotate the damper 56, and also reduce airflow noise.

In the above embodiment, the damper 56 is provided in the blow-out passage 26, but, for example, the damper may be provided in the duct 25. That is, for example, the damper may be provided in both the blow-out passage 26 and the duct 25, or may be provided in either one of the blow-out passage 26 and the duct 25.

EXPLANATION OF REFERENCES 1 outdoor unit
2 indoor unit 11 compressor
12 four-way switching valve
13 outdoor heat exchanger
14 electric expansion valve
15 indoor heat exchanger
16 accumulator
17 outdoor fan
18 turbo fan
20 casing
21 bottom frame
22 front frame
22a upper blow-out port
22b lower blow-out port
23 intake panel
25 duct (first flow path)
26 blow-out passage (second flow path)
27 indoor temperature sensor
30 horizontal flap (first member)
31 flap main body
32 support portion
33 flap drive unit
40 fan guard
50 side intake port
51 drain pan
55 second heat insulating material
56 damper (second member)
57 damper drive unit
60 perpendicular flap
61 flap main body
62 attachment portion
63 operation portion
100 outdoor control device
200 indoor control device (control unit)

What is claimed is:

1. A floor-standing air conditioner comprising:
a casing including a first flow path connected to a first blow-out port positioned at an upper portion and a second flow path connected to a second blow-out port positioned at a lower portion;
a fan that blows out air from at least one of the first blow-out port and/or the second blow-out port;
a first member that opens or closes the first flow path, the first member being one of a first flap or a first damper;
a second member that opens or closes the second flow path, the second member being one of a second flap or a second damper; and
a controller that controls the fan, the first member, and the second member, wherein
the controller is configured to
perform a first blowing process of blowing out air from the first blow-out port with the first flow path opened by the first member and the second flow path closed by the second member,
perform a second blowing process of blowing out air from the second blow-out port with the first flow path closed by the first member and the second flow path opened by the second member, and
perform a blow-out port switching process of blowing out air from both the first blow-out port and the second blow-out port during switching between the first blowing process and the second blowing process, and
perform the blow-out port switching process while driving the fan, and
wherein during the blow-out port switching process, controller is configured to start moving the second member while the first member is still moving.

2. The floor-standing air conditioner according to claim 1, wherein
the air blowing out from the second blow-out port during the second blowing process is larger in maximum airflow volume than the air blowing out from the first blow-out port during the first blowing process.

3. The floor-standing air conditioner according to claim 1, wherein
the first member is the first damper or the second member is the second damper that rotates between an open position on an upstream side of an air flow and a closed position on a downstream side of the air flow.

4. A floor-standing air conditioner comprising:
a casing including a first flow path connected to a first blow-out port positioned at an upper portion and a second flow path connected to a second blow-out port positioned at a lower portion;
a fan that blows out air from at least one of the first blow-out port and/or the second blow-out port;
a first member that opens or closes the first flow path, the first member being one of a first flap or a first damper;
a second member that opens or closes the second flow path, the second member being one of a second flap or a second damper; and
a controller that controls the fan, the first member, and the second member, wherein
the controller is configured to
perform a first blowing process of blowing out air from the first blow-out port with the first flow path opened by the first member and the second flow path closed by the second member,
perform a second blowing process of blowing out air from the second blow-out port with the first flow path closed by the first member and the second flow path opened by the second member, and
perform a blow-out port switching process of blowing out air from both the first blow-out port and the second blow-out port during switching between the first blowing process and the second blowing process, and
the blow-out port switching process is made lower in number of rotations of the fan than the first blowing process or the second blowing process and
wherein during the blow-out port switching process, the controller is configured to start moving the second member while the first member is still moving.

5. The floor-standing air conditioner according to claim 4, wherein
the first member is the first damper or the second member is the second damper that rotates between an open position on an upstream side of an air flow and a closed position on a downstream side of the air flow.

6. The floor-standing air conditioner according to claim 4, wherein
the controller is configured to start to move the first member or the second member from a closed position to an open position after reducing a number of rotations of the fan.

7. The floor-standing air conditioner according to claim 4, wherein
the controller is configured to perform the blow-out port switching process of changing a number of rotations of the fan from low output to high output upon completion of movement of the first member or the second member to an open position.

* * * * *